(12) United States Patent
Liu

(10) Patent No.: US 10,904,395 B1
(45) Date of Patent: Jan. 26, 2021

(54) TEMPLATE-BASED CONFIGURATION AND MANAGEMENT OF TELECOMMUNICATIONS SERVICES

(71) Applicant: 8x8, Inc., San Jose, CA (US)

(72) Inventor: Zhishen Liu, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

(21) Appl. No.: 16/418,304

(22) Filed: May 21, 2019

Related U.S. Application Data

(63) Continuation of application No. 15/624,542, filed on Jun. 15, 2017, now Pat. No. 10,298,770, which is a continuation-in-part of application No. 15/240,391, filed on Aug. 18, 2016, now Pat. No. 10,404,759, and a continuation-in-part of application No. 15/240,457, filed on Aug. 18, 2016, now Pat. No. 10,135,974.

(60) Provisional application No. 62/353,971, filed on Jun. 23, 2016, provisional application No. 62/353,977, filed on Jun. 23, 2016.

(51) Int. Cl.
| | | |
|---|---|---|
| *G06F 15/16* | (2006.01) | |
| *H04M 7/00* | (2006.01) | |
| *H04L 29/06* | (2006.01) | |
| *H04M 3/42* | (2006.01) | |

(52) U.S. Cl.
CPC ........ *H04M 7/0087* (2013.01); *H04L 65/102* (2013.01); *H04L 65/1059* (2013.01); *H04M 3/42323* (2013.01); *H04M 7/009* (2013.01); *H04M 7/0075* (2013.01)

(58) Field of Classification Search
CPC .......................... H04L 65/102; H04L 65/1059
See application file for complete search history.

(56) References Cited

U.S. PATENT DOCUMENTS

| | | | |
|---|---|---|---|
| 8,656,417 B2 | 2/2014 | May | |
| 8,964,726 B2 | 2/2015 | Lawson et al. | |
| 9,137,127 B2 | 9/2015 | Nowack et al. | |
| 9,160,696 B2 | 10/2015 | Wilsher et al. | |
| 9,232,045 B1* | 1/2016 | Price | H04M 3/12 |

(Continued)

OTHER PUBLICATIONS

"Cisco Hosted Unified Communications Services", Cisco Product Data Sheet, Jun. 18, 2007 (retreived May 31, 2016) http://www.cisco.com/c/en/us/products/collateral/unified-communications/product_data_sheet0900aecd80670040.html.

*Primary Examiner* — Richard G Keehn
(74) *Attorney, Agent, or Firm* — Crawford Maunu PLLC

(57) ABSTRACT

Certain aspects of the disclosure are directed to template-based configuration and management of telecommunications services. According to a specific example, a VoIP server is provided comprising one or more computer processor circuits configured to interface with a remotely-situated client entity using a first programming language. The VoIP server includes a provisioning circuit and a call control circuit. The provisioning circuit is configured to identify a provisioning template for at least one extension for a client entity, and configure the extension for one or more call processing functions. The call control circuit is configured identify at least one call control template written in a second programming language. The call control circuit is further configured to control call routing for VoIP telephone calls by executing the call control template, and to implement one or more call processing functions specified by the call control template as being conditional upon retrieved data.

20 Claims, 7 Drawing Sheets

(56) References Cited

U.S. PATENT DOCUMENTS

| | | | |
|---|---|---|---|
| 9,240,966 B2 | 1/2016 | Wilsher et al. | |
| 9,270,833 B2 | 2/2016 | Ballai et al. | |
| 9,294,515 B2 | 3/2016 | Sayko | |
| 9,306,982 B2 | 4/2016 | Lawson et al. | |
| 9,338,064 B2 | 5/2016 | Stratton et al. | |
| 9,344,573 B2 | 5/2016 | Wolthuis et al. | |
| 9,407,597 B2 | 8/2016 | Lawson et al. | |
| 9,455,949 B2 | 9/2016 | Lawson et al. | |
| 9,456,008 B2 | 9/2016 | Lawson et al. | |
| 9,459,925 B2 | 10/2016 | Lawson et al. | |
| 9,459,926 B2 | 10/2016 | Shakirzyanov et al. | |
| 2006/0023657 A1* | 2/2006 | Woodson | H04W 8/18 370/328 |
| 2006/0030357 A1* | 2/2006 | McConnell | H04W 84/16 455/554.1 |
| 2006/0039354 A1* | 2/2006 | Rao | H04L 47/36 370/352 |
| 2008/0175230 A1* | 7/2008 | Brand | H04M 7/006 370/352 |
| 2009/0129374 A1* | 5/2009 | Yurchenko | H04L 45/304 370/352 |
| 2010/0142516 A1 | 6/2010 | Lawson et al. | |
| 2010/0232594 A1 | 9/2010 | Lawson et al. | |
| 2011/0320550 A1 | 12/2011 | Lawson et al. | |
| 2012/0069131 A1* | 3/2012 | Abelow | G06Q 10/067 348/14.01 |
| 2012/0208495 A1 | 8/2012 | Lawson et al. | |
| 2012/0304245 A1 | 11/2012 | Lawson et al. | |
| 2013/0072153 A1 | 3/2013 | Lawson et al. | |
| 2013/0212603 A1 | 8/2013 | Cooke et al. | |
| 2013/0238338 A1* | 9/2013 | Kharod | G10L 13/08 704/260 |
| 2013/0290494 A1* | 10/2013 | Goudarzi | H04L 65/1093 709/219 |
| 2013/0304929 A1 | 11/2013 | Fahlgren et al. | |
| 2013/0339464 A1* | 12/2013 | Goudarzi | H04L 67/14 709/206 |
| 2014/0044123 A1 | 2/2014 | Lawson et al. | |
| 2014/0105372 A1 | 4/2014 | Nowack et al. | |
| 2016/0352790 A1* | 12/2016 | Hollingsworth | H04L 67/18 |

\* cited by examiner

US 10,904,395 B1

TEMPLATE-BASED CONFIGURATION AND MANAGEMENT OF TELECOMMUNICATIONS SERVICES

OVERVIEW

Aspects of various embodiments are directed to communications and computing services. Voice over Internet Protocol (VoIP) and other telecommunications platforms have allowed individuals to make telephone calls using broadband Internet connections in place of traditional telephone lines. A VoIP endpoint device can use a broadband Internet connection to connect to a VoIP server that is managed by a VoIP service provider. The VoIP server can handle call routing and provide other VoIP services for the VoIP endpoint device.

Computer servers are increasingly being used to provide various services over a network including, but not limited to, VoIP communications services such as VoIP calls, video conferencing, call exchange servers, packet switching, and traffic management as well as non-VoIP services including, but not limited to: website hosting, remote data storage, remote computing services, and virtual computing environments.

The use of VoIP telecommunications services has been widespread and significant in terms of both numbers of users and types of services being made available. This growth may be attributable to any of a wide variety of socio-economic changes such as the mobility of users of these services, the types and reduced costs of portable telecommunications tools, and the ever-evolving technology adapting to the personal and business needs of the telecommunications users.

For business entities, the increased use of VoIP telecommunications services has been particularly complex, largely due to providing the same level of personal features to users from the vantage point of each business entity's telecommunications platform. As examples, a VoIP telecommunications service provider, such as 8×8, Inc., can provide such VoIP services to a multitude of business entities each of which uses the provided services for a customized platform configured to provide telecommunications services to a wide range of employees. For each such customized platform, it can be particularly burdensome for the VoIP telecommunications service provider to adjust and reconfigure the customized platform (of each respective business entity to which such services are being provided) each time a business entity (e.g., as requested by the entity's IT department, employee(s) or others) changes in terms of the employee's communications equipment/endpoint devices.

SUMMARY

Various example embodiments are directed to issues such as those addressed above and/or others which may become apparent from the following disclosure concerning systems and methods for template-based management of telecommunications services.

Embodiments are directed toward methods for use in telecommunications systems employing a VoIP server operated by a telecommunications provider, where the VoIP server on the VoIP provider side (aka VoIP provider server as commercially available services from 8×8, Inc.), is used to provide VoIP services to a multitude of client entities. Such embodiments describe a template-based and intelligent call routing system whereby call routing and call processing is performed with a data driven approach. In such systems, the VoIP server includes one or more computer processor circuits that act as a provisioning engine for configuring individual extension accounts and/or groups of extension accounts according to defined provisioning templates. The VoIP server also includes a telecommunications call-control engine for routing, processing calls and/or providing related telecommunications services on behalf of client entities. Such client entities may be exemplified respectively as the above-noted businesses with employees ranging in number from just a few to thousands, and being located/mobile for communications services in any of a multitude of venues.

In these embodiments, such methods use the provisioning engine to configure at least one extension of a client entity for providing one or more call processing functions. Such methods further use the call-control engine to provide the telecommunications services by receiving VoIP telephone calls from VoIP endpoint devices, and identifying client-specific sets of control data (e.g., providing directives or commands with call processing data) derived from programming instructions corresponding to an instruction-configurable/programmable language that is associated with a message exchange protocol used between the VoIP call routing server and data sources.

Examples of such client-specific programming instructions may include other forms of code providing data and/or instructions over an interface facilitating communication between the telecommunications provider and the VoIP endpoint devices. Client-specific sets of control data may be derived from the programming instructions received from the client entity. Such methods execute the client-specific sets of control data to make decisions on how to configure at least one extension of a client entity for providing telecommunications services. Once configured, such methods execute the client-specific sets of control data to make decisions on how to route calls placed by the VoIP endpoint devices, and to identify a set of instructions (written in a second instruction-configurable/programmable language) associated with the routing decisions. The first and second programmable languages may be similar, in that both languages are derivatives of a same type of programmable language, but the first and second programmable languages may differ in terms of content and use. The first programmable language may identify call processing directives provided by the telecommunications provider to the client entity, whereas the second programmable language may identify call routing directives as provided to the telecommunications provider by the client entity. The provisioning template(s), as described herein, may be written in a programming language that corresponds with the first and/or second programming language and uses information from the first and/or second programming language to configure extensions for providing call processing functions. Such methods execute the set of instructions to retrieve data from the data sources maintained by the telecommunications provider, and provide, in response to the data, call control functionality for the VoIP calls placed by the endpoint device. In such a manner, various embodiments herein describe a template-based and intelligent call routing system whereby call routing and call processing is performed with a data driven approach. The data retrieved from the data sources can be PBX data and/or data relating to PBX states, VoIP provider system record data, customer data hosted in VoIP provider space, and/or customer data hosted in a private cloud or in premises with public APIs.

Certain embodiments are directed toward a VoIP provider server comprising one or more computer processor circuits coupled to memory circuits and configured to interface with a plurality of remotely-situated client entities. The VoIP provider server is configured and arranged to provide a database with a set of virtual office features including client-specific call routing functions, available to remotely-situated client entities based on a subscription. The VoIP provider server is further configured and arranged to provide to the client entities, a set of instructions written in the first programming language. The VoIP provider server is further configured and arranged to provide a private branch exchange (PBX) for the client entity, and to identify a provisioning template for at least one extension of the client entity, wherein the provisioning template includes configuration parameters for providing one or more call processing functions to the extension. The VoIP provider server is configured and arranged to configure the extension for the one or more call processing functions based on the provisioning template. Moreover, the VoIP provider server is configured and arranged to identify a call control template that may include call processing functions common to a plurality of end-users of the client entity. The VoIP server may then control call routing by the PBX and for the VoIP telephone call by executing the call control template and identifying a data source that corresponds to the VoIP telephone call. The VoIP server may retrieve data from the data source and implement one or more call processing functions specified in the call control template as being conditional upon the retrieved data.

The above discussion/summary is not intended to describe each embodiment or every implementation of the present disclosure. The figures and detailed description that follow also exemplify various embodiments.

BRIEF DESCRIPTION OF THE FIGURES

The disclosure may be more completely understood in consideration of the following detailed description of various embodiments of the disclosure, in connection with the accompanying drawings in which.

Figure 1:
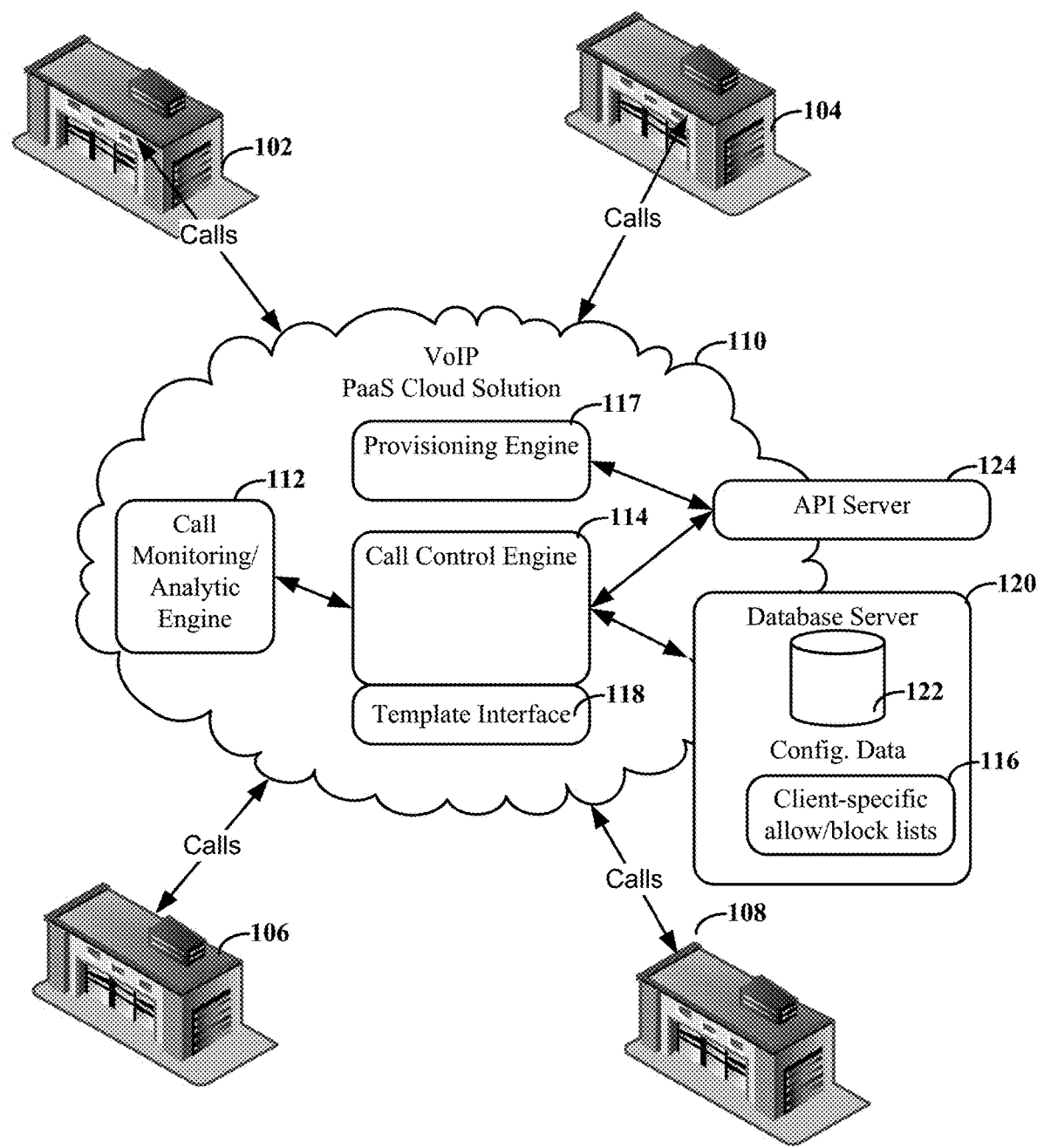
FIG. 1 depicts a diagram of a VoIP system that uses templates for configuration and management of telecommunications services, consistent with embodiments of the present disclosure.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems and methods involving template-based configuration and management of telecommunications services. In certain implementations, aspects of the present disclosure have been shown to be beneficial when used in the context of providing VoIP communications services. While the present disclosure is not necessarily limited to such VoIP communications systems as described herein, for purposes of facilitating understanding and appreciation of certain embodiments, the following discussion uses such VoIP-based services and systems in the context and on behalf of telecommunications platforms of client entities which subscribe to such services from a VoIP telecommunications service provider (with a server).

According to certain embodiments, a VoIP communications system may be configured to allow a client-specific control engine to dynamically modify and control the call flow and processing at different levels within the system, including (re)routing of incoming calls generally and by way of private branch exchanges (PBXs) and Internet Protocol PBXs (or IP PBXs) to provide intelligent routing relative to receptionists and direct dial numbers for individuals using the IP PBXs. Rules of various complexity can be used for routing incoming calls, whether to one or more receptionists, directly to extensions, to voicemail, or for other call routing purposes. The logic used for the routing decisions can be based upon directives and related data shared across multiple PBXs, data that can be dynamically changed, and upon rules and logic that can be defined according to multiple tiers of call routing decisions. For example, a large company may have many different offices or store locations. Portions of the call routing and processing can be shared across the entire company. Other portions can be shared with subsets or groups (e.g., groups based upon geographic regions or countries or based upon different company divisions). Still further portions can be set based upon individuals being called. Such aspects can facilitate the configuration, management, and updating of the VoIP communications system, particularly in situations where there are many thousands of extension rules.

According to certain embodiments, the VoIP communications system may be arranged to configure at least one extension of a client entity for call processing functions provided by the VoIP service provider. Each client entity may be partitioned into multiple PBXs, and provisioning (e.g., configuring) the client entity or client entities for the various call processing functions may necessitate configuring an end-point device, a group of end-point devices, an entire branch of the PBX, and/or the entire PBX according to particular configuration parameters. Moreover, for each end-user of the client entity, various call processing functions may need to be configured, such as emergency service functions, caller identification options, and call routing options, among others. In accordance with the present disclosure, provisioning templates may be created and used to configure a client entity or client entities for various call processing functions. The provisioning template(s) may be used to configure various groups or subgroups of the VoIP system. For instance, a provisioning template may exist for an end-point device, for a PBX, for a branch of a PBX, and/or a particular extension or group of extensions of the PBX. Each provisioning template may capture configuration parameters for common call processing functions like the location of a common company as a default address for emergency services call processing functions, common call forwarding rules (such as, during hours and days of operation), caller ID options, call waiting option, and/or default dial plans. Each of the provisioning templates may have a unique template identifier (e.g., a template ID), such that when a user and/or extension is to be provisioned (e.g., configured), a provisioning template may be identified by template ID and applied to the selected extension(s).

Consistent with various embodiments, various provisioning templates may be arranged in a provisioning template hierarchy, where lower level portions of the VoIP system may inherit configuration parameters from higher level portions of the VoIP system. For example, at the highest level, a provisioning template may be created for a client entity, defining various configuration parameters for the client entity. A next highest level provisioning template may be created for each PBX within the client entity. A third highest level provisioning template may be created for branch extensions with each PBX, and a lowest level provisioning template may be created for a particular extension. In such a manner, provisioning templates may be used to configure multiple extensions within a client entity at once, while also retaining the ability to customize configuration parameters for particular extensions. To find a particular provisioning template, an object may traverse parent nodes or grandparent nodes (e.g., higher level provisioning templates) to find configuration parameters to implement. For example, an extension may inherit caller ID configuration parameters from a branch level or a PBX level provisioning template if caller ID configuration parameters are not provided specifically at the extension level. This template concept for provisioning introduces a reference model, and hierarchy model to share configuration parameters among objects, and simplify the provisioning (e.g., configuration) needs for large enterprises with thousands of users, extensions, DIDs, and devices.

While the present disclosure is not necessarily limited to such embodiments, certain embodiments are disclosed and/or illustrated in connection with a system including cloud-based data centers that provide VoIP telephone services. The system can provide a user with access to, among other things, telephone call routing control, PBX functions, computer telephony integration (CTI), and data analytics (in this context the user can refer to, e.g., person, group, server or CPU, or subscribing business entity). Other functions and services can also be provided. Embodiments of the present disclosure are directed toward an interface that allows users/customers of the system to access VoIP telephone capabilities of the underlying system, including its hardware and software components, while maintaining the integrity and security of the underlying system. Particular embodiments are directed toward a system that allows for VoIP call flow control to be controlled while also providing the ability to interface with data sources that are either part of the underlying system or external to the system. Particular embodiments are directed toward a telecommunications solution that allows for template-based management of various virtual office features for end-users of the VoIP system. Common configurations shared among a group of end users may be populated using a configuration template(s), yet the virtual office features may be adjusted for such end users. These features can be used in combination with a call routing system that can be configured and adjusted in a scalable manner.

Consistent with various embodiments of the present disclosure, a call control engine can control the flow of calls as part of the system for the cloud-based VoIP telephone service. The call control engine includes an interface that customers of the VoIP telephone service can use to access call control functionality of the VoIP telephone service. In particular embodiments, the interface allows customers to provide call control documents that provide customization over how the VoIP telephone service operates for each particular customer. The call control documents can be designed to function as high-level templates that can be applied for a large number of individual VoIP endpoint devices and subscribers. The call control engine provides the capability to customize the documents at varying levels of granularity using one or more data sources, such as a customer-maintained database that stores employee-specific call control functions. The decoupling of the documents from the low-level customization can be particularly useful for providing scalability to the system.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to VoIP communications servers configured to provide VoIP communications services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services.

Some remote service providers customize their services for different customers. This might include customizable auto attendants, call routing, call forwarding, voicemail, or other features. For particularly large clients with many different telephone accounts and numbers, implementing and updating these types of customizations can be a significant undertaking. Certain embodiments of the present disclosure are directed toward an interface that allows a client-specific control engine to access and dynamically adjust the manner in which remote services are provided for the users of a client account during operation, while maintaining the integrity and security of the underlying system for providing the remote services. Also, embodiments of the present disclosure are directed toward provisioning templates in which client entities can configure endpoints for the client entity to provide the underlying VoIP call functions.

According to certain embodiments, the VoIP communications system provides inbound and outbound call routing for one or more PBXs. A PBX is a telephone system that switches calls between enterprise users on local lines while allowing all users to share a certain number of external phone lines. External phone lines are telephone lines that are supported by telephone carriers as being individually addressable within the public switched telephone network (PSTN). For example, a PBX can use extensions to direct calls to many phones after a caller first makes a call to a shared number. As another example, a PBX can provide direct Inward Dialing (DID). DID is a service where a telephone carrier provides a block of telephone numbers that are each routed to a PBX system rather than to individual telephone lines. Using DID, individual phone numbers can be provided to each person or workstation without separate physical lines.

The VoIP servers providing the underlying function for the VoIP system can be configured to utilize a programmable (or configurable) communications protocol such as a high-level, domain-specific programming language as might be implemented with respective VoIP servers providing VoIP call routing and IP PBX functions on respective sides of an interface configured to facilitate the communications via the defined protocol. A particular example of a VoIP server may use session initiation protocol (SIP) to handle various call functions (e.g., call setup and tear down). However, the various embodiments discussed herein are not necessarily limited thereto. Consistent with the above and in other embodiments disclosed herein, the VoIP servers can be configured to establish a leg of the call from the VoIP endpoint devices (or dial peers) to another VoIP endpoint device or to endpoints on the PSTN through use of a VoIP-PSTN gateway.

According to more specific example embodiments, a high-level domain-specific programmable communications protocol (e.g., specific to customer-entity domains) uses one or more languages which are defined using a markup language as the basis for the language structure. Particular implementations relate to the use of at least two domain-specific languages, one that can be used for initial call routing and the other for providing more complex and specific call processing functions. More particular example embodiments use an eXtensible Markup Language (XML). An XML model defines the constraints on the high-level language, including defining the set of valid commands that can be carried out by the VoIP servers. Within these constraints, a customer can write XML code that self-describes the building blocks or particular configurations used in the customer's particular application. For instance, a common set of instructions, written in the high-level language (e.g., an XML language) may be provided by a VoIP provider to client entities. The common set of instructions may form a template to be populated with client-specific directives, the populated template forming programming instructions that instruct the VoIP provider how a particular client entity is to be configured for various VoIP services. In such a manner, the VoIP provider may provide a lightweight and simplified set of instructions to client entities, and client entities may provide the VoIP provider with instructions to customize the virtual office services for that particular client entity. XML also allows for various different data structures to be embedded into the XML document or file. For example, a script written in JavaScript can be embedded as character data that the VoIP servers are configured to identify and execute. Unless otherwise stated, the use of XML in connection with various embodiments does not necessarily limit the corresponding embodiments, such as limiting the embodiments to the use of only an XML-based language(s). As used herein, such domain-specific programming language(s) are referred to as high-level markup languages (e.g., XML derivative languages or XML-type languages).

Various examples of such XML derivative languages are exemplified in U.S. patent application Ser. Nos. 15/377,778 and 15/377,797 filed on Dec. 13, 2016, and entitled "Region-based connecting of calls using client-specific control and provisioned numbers" and "Region-based bridging of calls using client-specific control and revised caller identifiers" (respectively) which are fully incorporated by reference herein. In certain example VoIP applications, two XML-type languages are implemented as a call processing XML and a call routing XML, respectively as XML derivative languages corresponding to XML but customized for processing VoIP calls on the side of the interface operating on behalf of customer entities and on the other side of the interface for higher level processing (including, for example, call routing) by the VoIP service provider. For further application-specific examples of such XML-type customization, reference may be made to discussion of CPXML and CRXML as disclosed in U.S. patent application Ser. Nos. 15/377,778 and 15/377,797. Such XML derivative languages can be written specific to types of functionality as needed for various customer entities, thereby allowing developers to program call processing logic or service execution logic with both XML building blocks and JavaScript/TCL, or other scripting languages best suited to levels (e.g., in terms of quantity range) of a customer's endpoint devices and/or in terms of complexity of the VoIP-based media functionality and evolving demands expected by a customer. In certain implementations, XML derivative languages allow VoIP customer developers to program and integrate VoIP call flow (e.g., as provided by a cloud-based VoIP service) with customer or third party application servers and databases. In particular, the call flow can include a connection that is used as part of call routing decisions and call processing options that are related to one or more receptionists that can answer calls to a group of endpoint devices. The system allows different levels of call control logic to be implemented in a manner that can facilitate scalability of the system of large organizations with many endpoint devices and/or end-users and with complex organizational structures that have corresponding complex call routing requirements.

For ease of discussion, various embodiments are discussed in terms of XML, and more particularly, XML derivative languages. The skilled artisan would appreciate that each such XML-type embodiment is not necessarily limited to XML, XML derivative languages, or variants of XML. The corresponding directives, control and related telecommunications data can be provided in documents corresponding to other languages and/or communications protocols; for example, one such programming language can be used for initial call routing and another programming language can be used for providing more complex and specific call processing functions. For more general information regarding implementation and control relating to such client-directed telecommunications services (and more specifically interface/communications implementations), reference may be made to U.S. Patent Application Ser. No. 62/353,971 filed on Jun. 23, 2016, and entitled "Client-Specific Control of Shared Telecommunications Services," U.S. patent application Ser. No. 15/240,391 filed Aug. 18, 2016, and entitled "Client-Specific Control of Shared Telecommunications Services," U.S. Patent Application Ser. No. 62/353,977 filed Jun. 23, 2016, and entitled "Client-Specific Control of Shared Telecommunications Services," and U.S. patent application Ser. No. 15/240,457 filed on Aug. 18, 2016, and entitled "Client-Specific Control of Shared Telecommunications Services," which are fully incorporated by reference herein. As discussed above, instead of or in combination with such XML-type languages, these other implementations may be realized as being suitable for serving telecommunications with different size and/or complexity metrics as needed to provide adequate telecommunications service to customer entities.

Client-specific sets of control data may be generated responsive and according to client-specific directives. Consistent with the above-characterized embodiments, at the client side of the VoIP communications services, the client's computer-based processing resource (e.g., by the client-specific control engine) generates and submits programming instructions from which client-specific sets of control data are derived, the client-specific sets of control data for assessment and use by the VoIP communications service provider. In a typical implementation, these client-specific sets of control data can be realized using codes or one or more commands (or a script of program-created commands). As examples, such codes or command sets can be implemented using a variety of programming control approaches. These approaches include, for example, a programming language (such as C++, XML, JAVA, HTML, SQL, etc.) common to both the client-specific control engine and to the VoIP communications service provider, which receives the programming instructions (submitted from the client side) for adjusting the VoIP communications services being provided to the submitting client.

By using a common interface protocol (e.g., the programming language, codes or command sets) which is understood by the VoIP communications service provider, authentication and updating for added (telephony) services is readily achieved automatically and remotely without burdening the VoIP communications service provider with cost-intensive set up procedures. Depending on the level of services being added/changed for each client, and/or depending on the client's manual-operator and/or automated technology, the client-specific sets of control data can be generated and submitted in various (coded) ways such as described above and also, for example, by dial tone input generated remotely on behalf of each client, by smartphone app specific to the client, by voice recognition, or combinations thereof. The client-specific sets of control data for a particular client entity may be generated based on various data metrics including, for example, VoIP call events or data received from the VoIP communications server, client-specific directives received in the form of user input (e.g., input via dial-tones and/or GUI), data acquired from a client (e.g., from a client database), and/or data provided by third parties (e.g., third party monitoring services).

FIG. 1 depicts a diagram of a VoIP system that uses templates for management of telecommunications services, consistent with embodiments of the present disclosure. Building symbols 102, 104, 106, and 108 represent different physical and logical locations for a customer of the VoIP PaaS cloud solution 110. The customer might, for example, be an enterprise customer that has many thousands of individual employees and telephone extensions. In such an example, the four depicted buildings 102, 104, 106, and 108 might be extended to hundreds or even thousands of separate locations (e.g., each corresponding to a different branch or store).

A provisioning engine 117 identifies a provisioning template for at least one extension of a client entity. The provisioning template may include configuration parameters for providing one or more call processing functions to the extension, and may be written in a corresponding programming language that uses information from the first programming language to provide the call processing functions. Moreover, the provisioning engine 117 may configure the extension for the one or more call processing functions based on the provisioning template. In some examples, the provisioning engine 117 is configured and arranged to identify the provisioning template by pointing to an extension of a provisioning template with a particular template identifier. That is, the provisioning engine 117 may maintain provisioning templates in a hierarchy, wherein configuration for lower level extensions inherit configuration parameters from higher level extensions. As described herein, the provisioning engine 117 can be configured and arranged to identify the configuration parameters for the call processing functions by traversing higher level provisioning templates. In such a manner, configuration parameters for higher level extensions may be provided, by default, to lower level extensions. That is, the provisioning engine 117 can configure the extension with configuration parameters from the higher-level provisioning templates in the absence of one or more configuration parameters for a particular call processing function. When configuring a particular extension or group of extensions, provisioning engine 117 may access a database that identifies each provisioning template by a different respective template identifier.

A call control engine 114 provides call control functions for calls to and from VoIP endpoint devices of the enterprise customer. According to various embodiments, the call control engine 114 can include a call control template engine 116 that uses one or more template-based documents to handle VoIP calls for different VoIP enterprise customers. The call control engine 114 can use call destination information carried by a VoIP call to invoke a proper VoIP call services action (e.g., CTI or a click to dial functionality), which in some instances can be provided by a third party application server using a VoIP provider's API server 124. Each enterprise customer can create and edit a call control template document using a template interface 118. For example, the template interface 118 can allow an enterprise customer to upload call control template documents (as well as provisioning template documents) as files to a cloud storage location. The enterprise customer can then edit the document files by uploading replacement files through the template interface 118. The template interface 118 might also be configured to provide a graphical user interface (GUI), whether based upon a web-browser or other application. The GUI can provide options for uploading and for directly editing the template documents within the infrastructure of the VoIP platform as a service (PaaS) cloud solution 110.

According to various embodiments, the call control template engine is configured to execute code within the documents, where the code is written in a high-level, domain-specific programming language. Particular example languages may include CPXML and CRXML. The programming language defines the message exchange protocol between a call control engine 114 (e.g., a call control server providing call switching functions) and other sources of information, such as databases, web applications, authentication servers, and servers providing various call-related services. For instance, a call control template document can be designed to implement call control functions that are contingent upon configuration data that is stored in database 122. The database server 120 that provides access to the configuration database 122 can be implemented as part of the VoIP PaaS cloud solution 110, or remotely (e.g., by the enterprise customer or a third party). The call control template document can also be designed to access call data relating to VoIP servers and VoIP endpoint devices, which can be provided by one or more call monitoring or call monitoring/analytic engines 112.

A particular, non-limiting example of a use for call control template documents relates to an enterprise customer that has many (e.g., thousands) extensions, and many (e.g., hundreds) "branch or store" offices. The enterprise customer may desire to have auto attendant services that are customized for each different branch. The customizations could include, for example, a branch-specific greeting that relates to office hours, location, and/or promotion messages based on schedules with branch specific time zones and languages. For instance, the enterprise customer may desire to have auto attendant services available in Spanish, French, and English for one branch location, and German, French, and Italian in another branch location. The customization might also specify how to distribute calls based on specific branch conditions for a certain number suffix. The enterprise customer might also want to frequently upload and play emergency or promotion messages to a group of branches/stores based on geographic region or other grouping (e.g., store size or store type).

Creating a separate schedule for each store can be prohibitively time consuming and present various problems with maintaining and updating the schedules. For example, consider the seemingly simple matter of modifying an auto attendant to account for holidays as exceptions to the normal greeting. For an enterprise customer with thousands of different stores in different locations and countries, differences in the holiday schedules can quickly become difficult to manage. For example, stores in different countries might observe different holidays. Moreover, stores with the same holidays might have different hours, events, and/or other store-specific differences that result in a different configuration of the auto attendant. Managing and updating the auto attendant to account for each store, and for all of the direct-inward dialing (DID) numbers for the stores, can be facilitated through the use of a call control template that provides the basic framework for each store to then provide respective customizations. In such a manner, each store may be configured with a same set of basic configurations yet retain the ability for local customization.

Consistent with various embodiments, a common call control template document can be created for use by all of the branch stores of the enterprise customer. The call control template document could be designed to request that the call control engine 114 retrieve the dialed number from call monitoring/analytic engine 112. The call control template document can then construct a database query that uses the dialed number as an index that identifies customer-specific data stored in the configuration database 122. The customer-specific data may include information that is linked to the dialed number, such as the branch identification, the time zone, the language(s), status and identification of promotional messages, the country or region, and/or the number to directly reach a receptionist. The call control template document can then direct the call control engine 114 to carry out call flow and call functions based upon the retrieved data. For example, the call control template document can contain a number of conditional statements that specify different actions depending upon the retrieved data. One such action could be the selection of a main greeting for the auto attendant. The document could construct a uniform resource locator (URL) string that identifies an audio file corresponding to the customer-specific data. In some implementations, the audio file could be hosted remotely from the VoIP PaaS cloud solution 110. To access audio hosted remotely, the call control template document could use a command "play" to instruct the call control engine to connect the call with a source of audio. For example, the document could use a URL to identify an audio file using <play <"/audio/xxxx"/>, or the call control template document could compose a URL with a Javascript expression that selects an audio file from directories differentiated by the branch ("branchID"):

<play expr="'https://respository.abc.com/audio/'+branchId+'/music.au"/>.

In another example, the customer-specific data may contain a listing of holiday schedules and associated store hours. In order to make changes to the holiday schedule, the database can be updated without needing to cross-correlate and update individual documents for each store. It is also possible to play different promotional messages for different regions, or other groupings of stores, using a call control template that uses customer-specific data about the relevant region/groupId to select and play the proper promotion messages.

According to certain embodiments, the call control template provides a structure that defines how different entities or groups can tailor their respective VoIP services. For example, an enterprise customer could provide a customization tool (e.g., through a web interface) that provides individual employees (e.g., individual end-users) with options for various VoIP call functions, such as how call-forwarding is handled, to set their work days and hours, or for other options. When an employee selects different options, the customization tool updates the configuration database 122 to reflect the selected options. A store manager might use the same customization tool to configure policies for numbers associated with a particular store. For example, outgoing calls could be limited during non-standard business hours, and/or special promotional messages could be selected and updated for a particular store, among other options.

Consistent with various embodiments of the present disclosure, the call control template document options can be implemented using VoIP servers that are configured to utilize a high-level, domain-specific programming language. Such high-level programming language allows developers to program call processing logic or service execution logic with both XML building blocks and Javascript/TCL scripting languages.

According to particular embodiments, an XML engine or other component of the VoIP cloud solution 110 can respond to a call, or other event, by sending requests to a web server and get XML derivative documents (e.g. a set of instructions) for processing (providing a set of directives or instructions for taking action), thereby operating in a stateless manner that is similar to how an Internet browser, or similar interface uses Hypertext Markup Language (HTML). The XML engine can interpret a received XML derivative document to identify XML building blocks that are then rendered (i.e., executed). Each building block can define logic relating to one or more functions, such as for voice, call control, and flow control logic. The XML engine may also execute other types of code, such as JavaScript, to create dynamic content (e.g., dynamically generated XML-derivative) for client-side flow control. Each XML derivative document may have uniform resource identifier (URI) links to a web server for iterative processing, or it may include query requests for retrieving data from various sources of data. A query could be formatted for consistency with the source of the data (e.g., by using JavaScript Object Notation (JSON) to retrieve data from third party application servers or from the VoIP server provider's cloud database). This information can then be used to drive call flow or call control functionality and decisions.

According to various embodiments, the high-level programming language may allow a programmer access to a controlled and limited set of call control operations and functions. The limitations on the operations can be particularly useful for allowing programming control to be placed into the hands of different clients of the provider of the VoIP servers. For example, the provider can update or make other changes to how the VoIP servers are configured without requiring that scripts written in the high-level language be modified to account for the changes. Moreover, the VoIP servers and their data can be protected from poor programming decisions (intentional or otherwise) by tightly controlling the extent that the scripts can access the inner workings of the VoIP servers.

In various embodiments, the high-level programming language and the VoIP servers that execute the high-level programming language can be configured to interface with other sources of data and control. This can include, for example, flow control decisions that are based upon code running on the client side or on the server side. As non-limiting examples, a client side computer system could run code that is written using Javascript or TCL, while a server-side computer system might run code that is written using PHP, NodeJS, Python, Scala, Rubby, .Net, or other web languages. In some embodiments, the high-level programming language can include commands that allow queries be sent to various databases, whether the database is controlled by the client or VoIP provider. The high-level programming language can also allow for calls to web-based (e.g., HTML) servers or to APIs of the VoIP provider or client.

Consistent with certain embodiments, the high-level programming language provides interface options that allow for authorization and authentication services to be accessed and used as part of the call control functions. For example, the high-level programming language can access an authentication server to verify (and grant) access rights for certain databases or services.

According to embodiments of the present disclosure, the VoIP servers can be configured to use different high-level programming languages for different functions, where each programming language has a different set of commands. For example, a first high-level programming language can be used in call routing decisions. These call routing decisions might, for example, identify a particular branch office or iPBX. The identified iPBX might then have additional scripts written in a second high-level programming language, where each script can be associated with a particular account or another identifiable grouping. The distinction between programming languages can be particularly useful in terms of improving the scalability of the system, as discussed in more detail herein.

Various embodiments of the present disclosure are directed toward VoIP servers that are designed to provide options for dynamically updating and accessing the high-level programming language. For instance, the VoIP servers can be configured to allow a client to upload new scripts as desired. Consistent with certain embodiments, the VoIP servers can be configured to allow for complex hierarchal scripting solutions that can improve scalability of the system. For example, call control decisions that are shared between certain groups of accounts can share a common file/script (e.g., provisioning template) that can be updated once for all of the groups. The shared files can call upon scripts for specific accounts to provide individual customizable options. The shared, higher-level files can be updated once for a potentially large number of individual accounts, while still providing individual configurability for each of the accounts.

Figure 2:
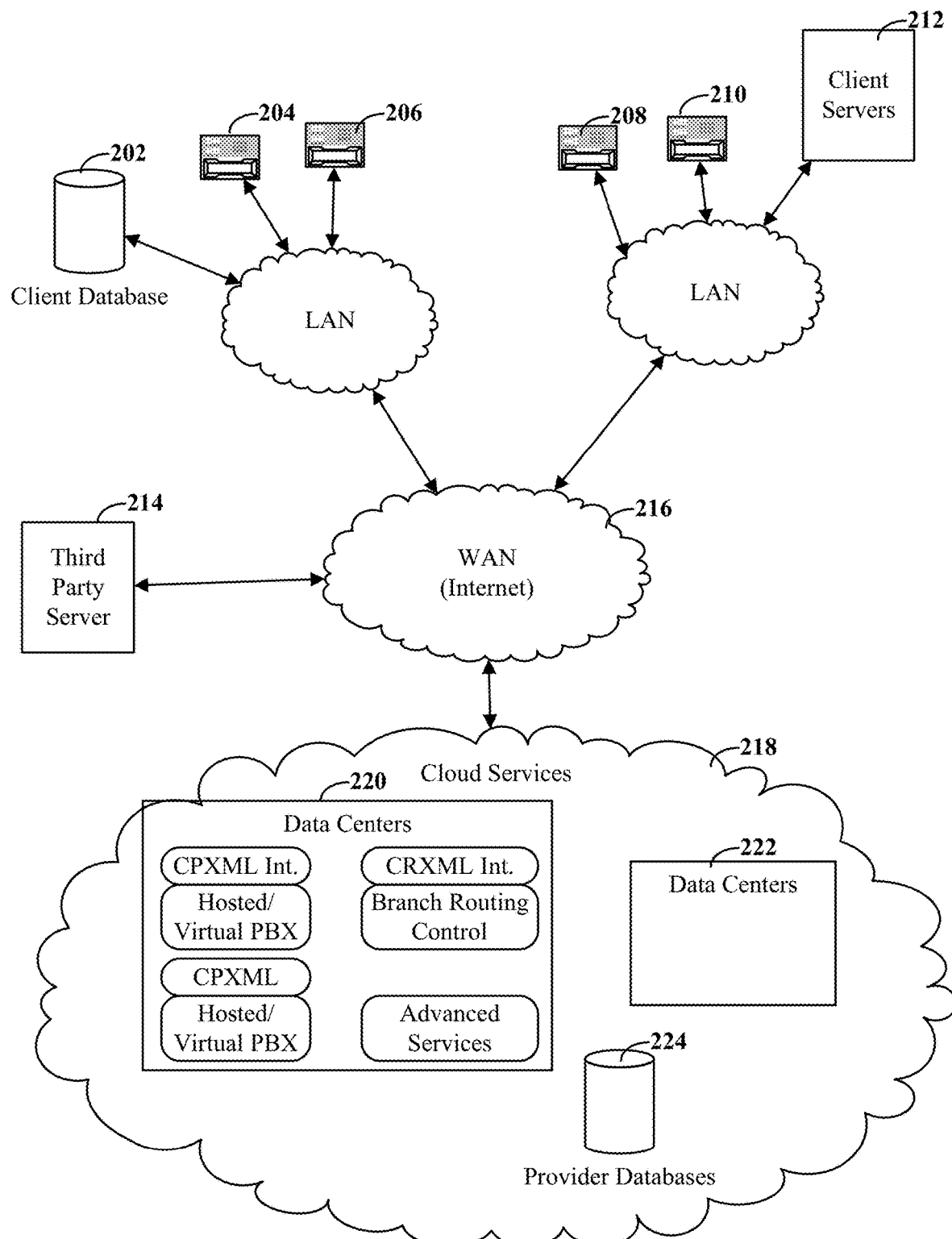
FIG. 2 is a diagram for a system that uses a high-level programming language for call control operations, consistent with embodiments of the present disclosure.

FIG. 2 is a diagram for a system that uses a high-level programming language for call control operations, consistent with embodiments of the present disclosure. In connection with these specifically-illustrated examples, VoIP endpoint devices 204, 206, 208, and 210 are configured to place and receive VoIP telephone calls between other VoIP endpoint devices, and also between non-VoIP endpoint devices (not depicted). The depicted examples of non-VoIP endpoint devices include plain old telephone service (POTS) telephones and cellular-capable devices, which might also be VoIP capable (e.g., smart phones with appropriate VoIP software applications). The various endpoint devices include circuitry that is specially configured to provide calling functions that include interfacing with the appropriate circuitry of the call service provider used by the corresponding endpoint device. In many contexts a VoIP-endpoint device is a VoIP-capable telephone commonly referred to as IP phones. The VoIP-endpoint devices can include, but are not limited to, desktop computers, mobile (smart) phones, laptop computers, and tablets. When each of the endpoint devices originates or receives a call in a telephone network, each can be characterized or referred to as an addressable call endpoint or a dial peer.

The call routing and other services for the VoIP telephone calls can be provided by one or more VoIP servers. In particular example embodiments, the VoIP servers can be located within one or more data centers 220, 222, which are part of a cloud services system 218. The data centers can be, for example, part of a cloud services system 218 where the hardware providing the cloud services is located in a number of different data centers with different physical locations. Consistent with embodiments, the cloud services can include SIP servers, media servers, and servers providing other services to both VoIP endpoint devices and the users of the VoIP endpoint devices. In some instances, the various servers, including both the VoIP Servers and data analytic servers discussed herein can have their functions spread across different physical and logical components. For instance, a cloud based solution can implement virtual servers that can share common hardware and can be migrated between different underlying hardware. Moreover, separate servers or modules can be configured to work together so that they collectively function as a single unified server.

Certain embodiments are directed toward a cloud services system 218 that is configured to allow clients to create webpages or other software that can initiate communications with endpoint devices in response to requests received over the Internet 216. In particular embodiments, the cloud services system 218 operates as a RESTful API that allows clients to generate URI links specifying parameters for a desired communication, such as content for use with generating outgoing calls from selections made through a web interface. For instance, a client server 212 can be configured to use an API to generate a URI link that can be displayed to an end user. The URI link can contain information that identifies an endpoint device and how the endpoint device is to be contacted (e.g., by telephone call or text message). The API generated URI link sends a communication request to the appropriate service within the data center. For example, the URI link can result in a communication with a call control server in order to initiate a telephone call to an endpoint device or a text message to an endpoint device.

According to various embodiments, one or more data analytics servers can monitor and analyze call data relating to the VoIP servers and VoIP endpoint devices. For example, a data analytics server can be designed to track call statistics about a variety of different call-related parameters, such as call duration, call date, call time of day, called parties, endpoint devices, selected data centers, selected carriers, dropped calls, transferred calls, voicemail access, conferencing features, and others. The high-level programming language(s) and the VoIP servers executing the languages can access these call summary metrics and the data analytics, which can be stored in a provider database 224. For example, a script running the VoIP server could direct the VoIP server to query or subscribe to call length summaries for all calls made to endpoints that are registered with the VoIP server. The script could then use the information control how calls are routed as well as how different (client or provider) services are invoked. According to various embodiments, the database queries could be sent to a client or customer database 202.

Consistent with certain embodiments, the cloud services system 218 can be configured to interface with client servers 212 or even with third party servers 214. For instance, an XML, derivative document stored by the cloud-based system 218 can identify, based upon a received call, a URI that points to client servers 212 or to a third party server 214. Data provided from these servers, e.g., in the form of a XML derivative document, can be used to specify call routing, or other functions. In the context of call routing to receptionists, the XML derivative document can include a URI that points to a secure server that provides information for making a routing decision. The call control server can then make a call routing decision based upon the information. This can add a layer of security because the VoIP server does not directly access the client information.

Figure 3:
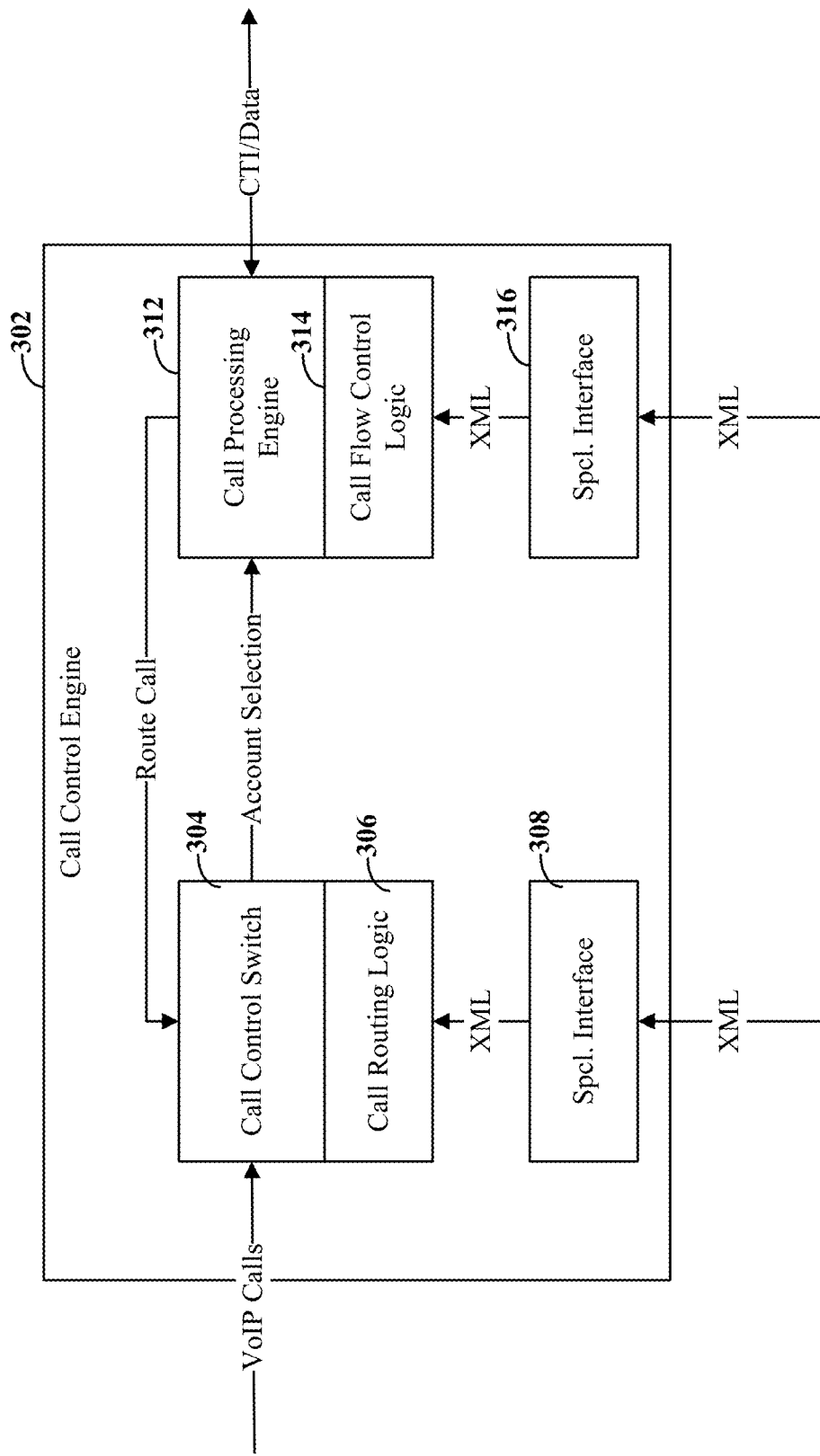
FIG. 3 is a block diagram of a call control engine with high-level programmable language logic for two different languages, consistent with embodiments of the present disclosure.

FIG. 3 is a block diagram of a call control engine with high-level programmable language logic for two different languages, consistent with embodiments of the present disclosure. When an incoming call is received by the call control engine 302, the call can first be handled by a call control switch 304. The call control switch 304 can be configured to receive and process a first document that defines how the call is subsequently routed. As discussed herein, this document can be written in a first programming language, such as a first XML derivative language, which provides limited access to the call routing control logic of the call control switch 304. First XML derivative documents can be provided by a customer through a special interface 308, which provides XML derivative documents to a call routing logic plugin 306. The call routing logic plugin 306 can parse and execute the first XML derivative documents while providing controlled access to the functions of the call control switch 304.

According to various embodiments of the present disclosure, the first XML derivative language defines a limited set of commands to the call routing logic that allow a customer to define how a call is initially routed. Maintaining the first XML derivative language as a limited set of simple building block commands can help with the efficiency of the call control switch. For example, the call control switch 304 can be located at the perimeter of the VoIP provider's routing network, which implies that it may be called on to handle a large volume of VoIP telephone calls. The efficiency in processing the large volume of calls can have a significant impact on the performance of the system.

Consistent with various embodiments, the first XML derivative documents specify a first level of call routing, and simple call processing, that is carried out by the call control switch 304. For example, a call control switch 304 may provide call routing options for multiple branch office or locations and for multiple iPBXes that support the branch locations. Each branch and iPBX may have multiple customer (user) accounts associated therewith. The first XML derivative documents can be used to determine the routing for a call by identifying a particular branch location, a particular iPBX and particular VoIP customer account and iPBX to use in subsequent routing. The initial routing decision is indicated by the arrow labelled as "account selection," which shows the passage of control to a call processing engine 312. The call processing engine 312 can be configured to identify and execute scripts based upon the identified account, or similar identifying information, as provided by the call control switch 304. As discussed herein, this script can be written in a second programming language, or second XML derivative document, which provides access to the call flow control logic of the call processing engine 312. In certain embodiments, the second XML derivative document can include commands that support contextual call routing and advanced call services. The second XML derivative documents can be provided by a customer using a special interface 316, which provides received second XML derivative documents to a call flow control logic 314. The call flow control logic 314 can execute the second XML derivative documents while providing controlled access to the functions of the call processing engine 312.

According to embodiments of the present disclosure, a second XML derivative document can be associated with a particular extension account (or group of extension accounts) and can be invoked when there is an incoming call route to the extension account. The call processing engine 312 can determine whether or not the XML derivative option has been enabled for the extension account. If enabled, then the call flow control logic 314 can be called. Consistent with various embodiments of the present disclosure, the call flow control logic 314 and the call routing logic 306 are each implemented as plugin applications that interface with the call control engine according to their respective XML-defined parameters.

In certain embodiments, the call processing engine 312 can have the capability to provide feedback to the call control switch 304. For example, an XML derivative document for a particular account may specify a condition that, if satisfied, routes a call to a different branch office. The call processing engine 312 is configurable, through one or more XML derivative commands, to provide an indication of a new call route decision as feedback to the call control switch 304. The call control switch 304 can respond by overriding the prior call routing decision and rerouting the call. The corresponding routing decision may then go to a different call processing engine 312, which can handle the call according to a different XML derivative document or the previously-used XML derivative document using different data to drive the call processing and routing decisions.

Consistent with various embodiments, outbound calls, or calls originating from VoIP devices supported by the call control engine 302 and the corresponding PaaS implementation, can be routed using XML derivative language and the call processing engine 312.

Figure 4:
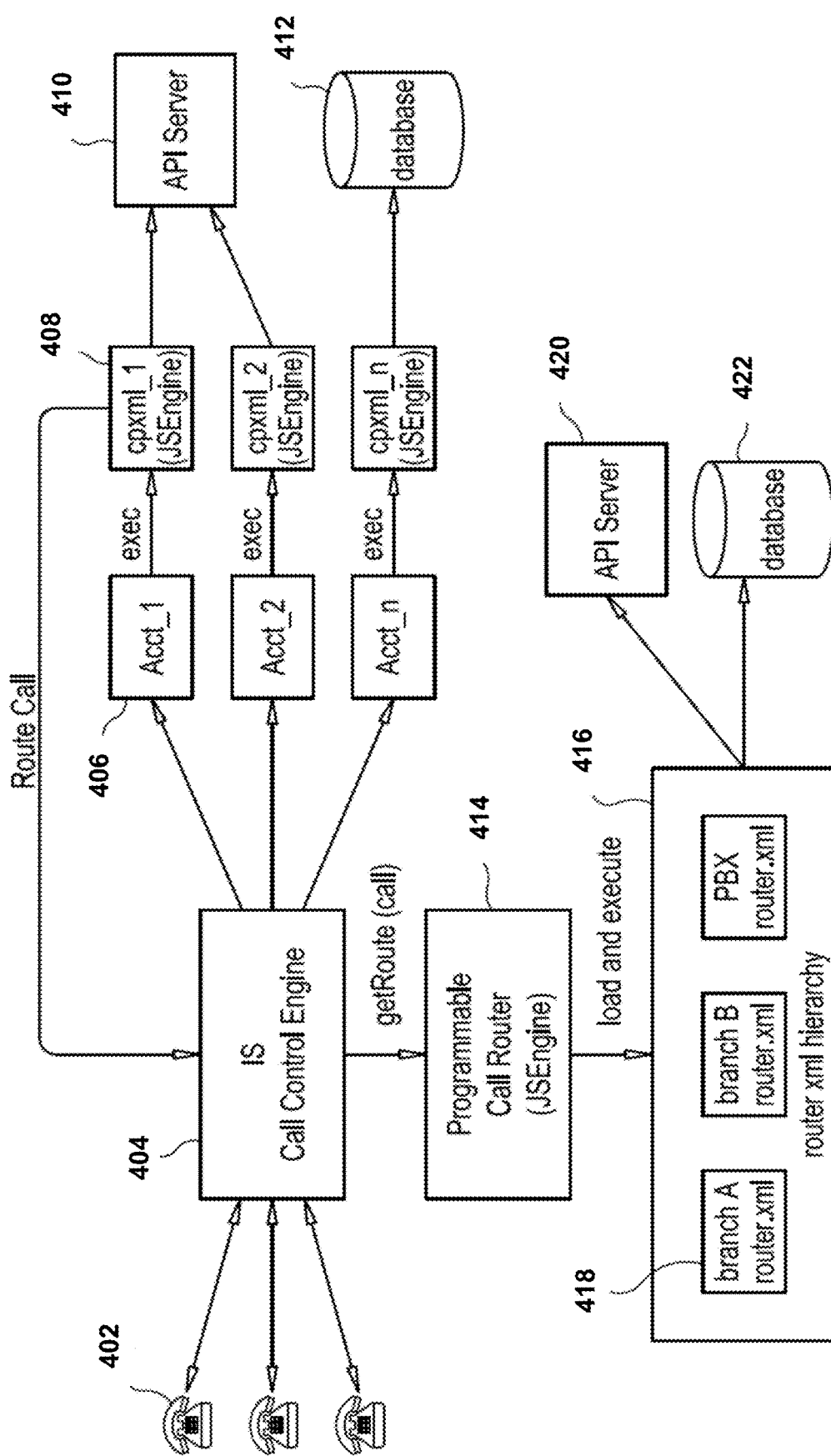
FIG. 4 is a block diagram showing a hierarchy of programmable language scripts, consistent with embodiments of the present disclosure.

FIG. 4 is a block diagram showing a hierarchy of programmable language scripts, consistent with embodiments of the present disclosure. Call control engine 404 can provide call flow control and routing. Consistent with various embodiments, the call control engine 404 is an iPBX that is part of a VoIP PaaS. For instance, the iPBX can provide Java-based solutions for managing voice over IP (VoIP) networks. The iPBX can be hosted by a VoIP service provider and located at a data center. Various iPBX features can be provided for clients and endpoint devices 402, such as call forwarding, remote pickup, call routing, and voice mail.

Consistent with various embodiments, customers of a VoIP provider can use the VoIP PaaS by generating documents written in two different XML languages: a first XML derivative language and a second XML derivative language. Together, the documents specify how the customer would like call interception rules to be handled for both inbound and outbound calls. For instance, a second XML derivative document 408 can be associated with an extension account 406, or with groups of extension accounts. The extension accounts 406 can represent a specific individual and their associated extension number(s). An XML derivative document 408 that is configured in this manner will be invoked by the call control engine 404 after an incoming call is routed to an extension that has XML, derivative capabilities enabled. XML, derivative documents can also be used for call flow processing of outbound calls. In addition to telephone calls, other forms of messages (e.g. text messages and email messages) can be automatically generated in response to outgoing calls using commands included in the second XML derivative document. Restrictions can be placed on outbound calls based upon factors such as time of day or call history. Another XML derivative function could be implementation of auto/call attendants that are each specific to the XML derivative-specified routing decision.

The call control engine 404 may also consult with programmable call router module 414. The call routers can be programmed using first XML derivative documents 418, and with JavaScript for dynamic data access and logic handling. The first XML derivative documents 418 can be arranged in router xml hierarchy 416, which can specify different XML derivative documents 418 depending upon the branch or iPBX that is identified as corresponding to the call. Once the call router scripts are loaded, they can be cached in memory and used by the call control engine 404 to make routing decision. When a call is routed through the call control engine 404, the call control engine can consult with branch-level XML derivative documents. The branch level can be identified, for example, based on the branchId of caller (for outbound calls) or callee (for inbound calls). If a route result is not determined, the call control engine 404 can also consult with a PBX-level first XML derivative document to obtain routing decisions. Examples of a route result from a script are "Accept," "Reject," or "NewRoute." Using the first XML derivative language, the programmable call router module 414 provides the call control engine 404 with the ability to handle call intercept/filter reject or re-route the call to a different target destination.

A particular example of uses for the first XML derivative documents is to provide initial routing decisions relative to a receptionist. A first XML derivative document can specify whether incoming calls are first routed to a receptionist. A few examples of how the first XML derivative rules and logic can be configured are discussed in more detail herein. If the call control engine 404 determines that the call is not to be first sent to a receptionist (or the call is being forward from the receptionist), the call control engine 404 can pass call routing control over to the logic defined by the appropriate XML derivative document 408.

The programmable call router module 414 can also be configured by a second XML derivative document to handle sophisticated call flow scenarios where the call routing is changed after the initial determination. For example, the second XML derivative can include commands (e.g., "Reroute") that the call control engine 404 uses to provide feedback to the programmable call router module 414, which uses the first XML derivative for initial routing decisions. This might allow, as an example, a first XML derivative routing decision to be overridden by the second XML derivative document(s).

According to particular embodiments, the programmable call routers (using XML derivative language) 414 can be viewed as plugins to the call control engine 404. The call router plugins may have two levels, Branch and PBX levels. The call router supports XML derivative-defined structures that specify how the PaaS can be utilized by a customer. For example, the XML derivative language can define sets of conditional statements, data access requests, and call routing commands: if/else, condition, goto, log, var, script, query, data, accept, reject, route statements, or other commands. In particular embodiments, the first XML derivative language can be considered a subset of the second XML derivative language by containing a part, but not all, of the second XML derivative language call flow commands. This distinction can be useful for keeping the first XML derivative documents light weight so that call routing decisions are simplified and efficient. More complex tasks, such as the use of media and advanced call handling, can be done using a second XML derivative language and the larger set of commands. Using such programmable call routes, a few example uses include: school district that generates a short message service (SMS) or email notification to parents whenever an emergency number is dialed; off hour restriction of outbound call with the second XML derivative language; call center lockdown to provide outbound dialing restriction for phones; computer initiated dialing with caller identification (ID) override based destination database table, and call return to target direct-inward-dial (DID)/agents; and implementation of a call black list (denying calls to/from the list) or white list (allowing calls to/from the list) with potentially large lists and dynamic updating capabilities.

Consistent with embodiments of the present disclosure, both the first XML derivative language and the second XML derivative language provide the capability of handling dynamic data from multiple sources. Examples of these sources are depicted as application program interface (API) servers 410, 420 and databases 412, 422. The dynamic data can therefore be provided from a variety of sources including, but not necessarily limited to, call route session data (caller ID, callee ID, or route from/to), query custom object (to a database) in the VoIP provider system/cloud, and access data through HTTP RESTful API.

Figure 5:
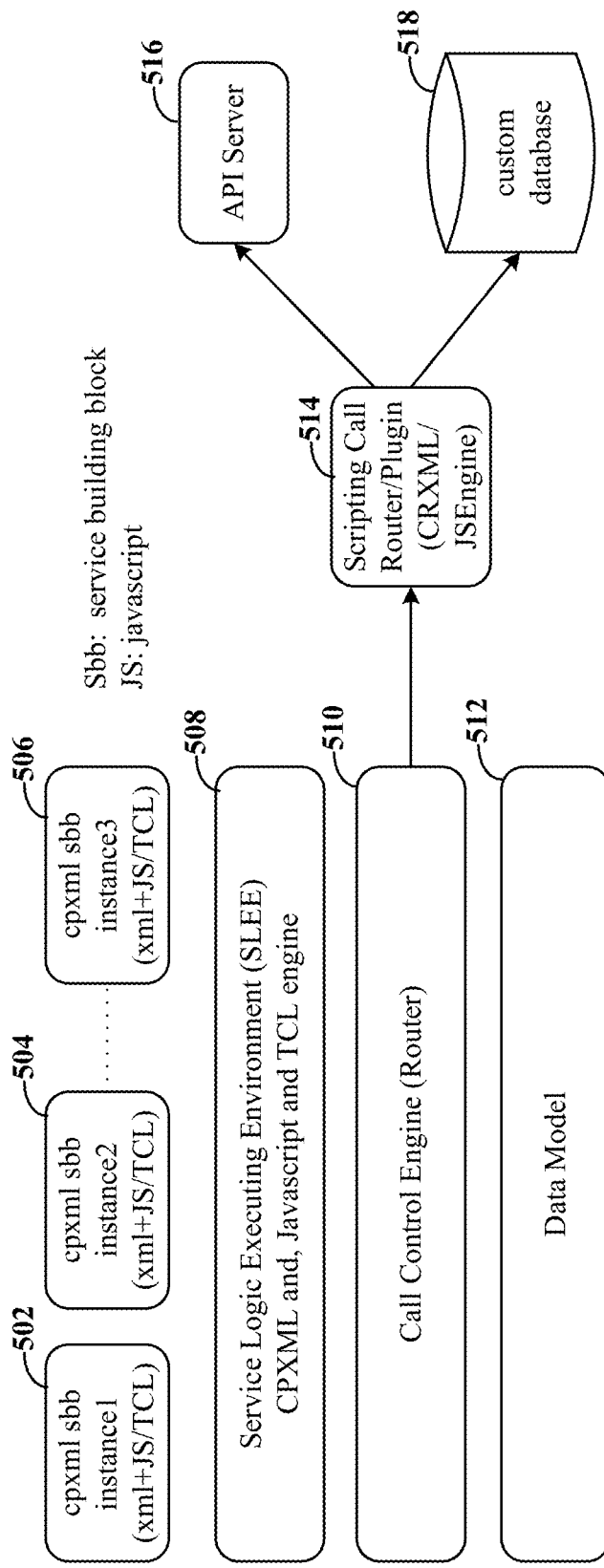
FIG. 5 is a block diagram that shows multiple conceptual layers in a call control system, consistent with embodiments of the present disclosure.

FIG. 5 is a block diagram that shows multiple conceptual layers in a call control system, consistent with embodiments of the present disclosure. The depicted configuration shows three sources of XML, derivative documents 502, 504, 506. The service logic executing environment 508 accesses and executes the XML derivative documents 502, 504, 506. The XML derivative documents can be embedded as part of a plugin 514 that can be used with other call flow solutions (e.g., as part of a CTI solution). The scripts can be loaded locally from each of the call control servers 510 or iPBXes, or loaded from remote web application server (e.g., using with HTTP(s) protocol). The integration of the layers facilitates the ability of a developer to use the (iPBX) data model 512, provider-hosted database(s), third-party application servers 516 and third party database(s) 518 to drive business and call flow logic and to integrate telecommunications with other capabilities and services.

Figure 6:
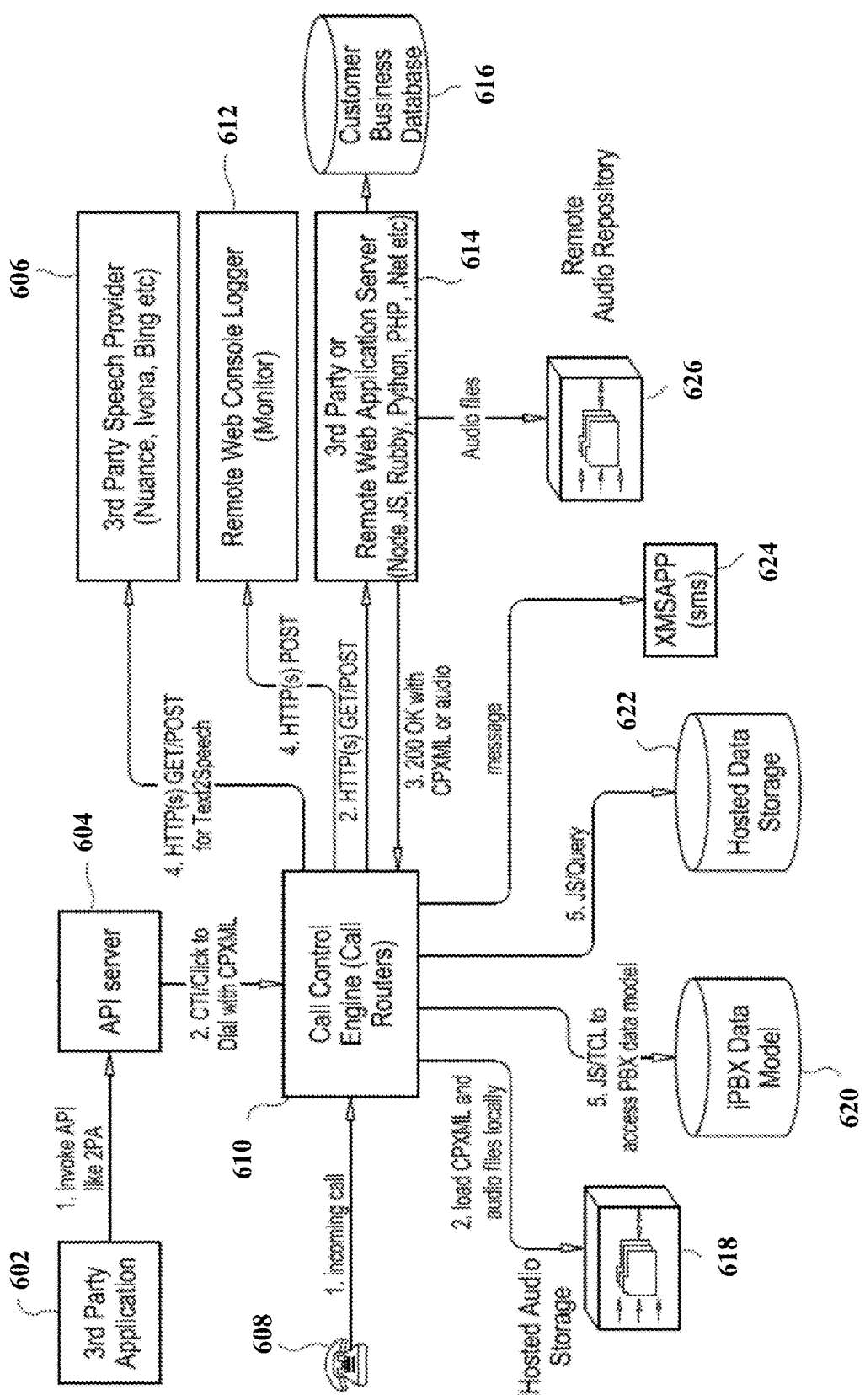
FIG. 6 is a block diagram showing interconnections to a call routing switch, consistent with embodiments of the present disclosure.

FIG. 6 is a block diagram showing interconnections to a call routing switch, consistent with embodiments of the present disclosure. As another particular non-limiting example, an incoming call is received from a telephone device 608 by the call control engine 610. The call control engine 610 can use the call destination information carried by the call to invoke a proper VoIP call services action (e.g., CTI or a click to dial functionality), which in some instances can be provided by a third party application server 602 using a VoIP provider's API server 604. The XML derivative documents can be embedded within the click-to-dial request or CTI service data.

As a particular example, a third party application can use an API provided by API server 604 to contact an authorization server for the purpose of obtaining authorization to use certain servers or functions of the system. The authorization procedure can include for example (without imposing limitations) the use of access tokens generated consistent with the authorization protocol. The API server 604 can also provide API functions that allow the third party application to embed XML derivative documents into call control requests. For example, the second XML derivative documents could be embedded in an HTTP request using a text-to-binary format, such as the Base64 format. The second XML derivative documents can include commands that rely upon the use of a variety of different functions offered by the system. This might include a text-to-speech application 606 or the playing of audio files 618 or 626. The second XML derivative documents might also include queries for information stored in databases 622 or 616.

In another non-limiting example, the API provided by API server 604 may make call routing decisions based on defined call options for particular applications. For instance, the API might include an option to perform an action such as play a recorded message to a particular destination using the call control engine 610. In another example, the API might include an option to block a caller identification function on email notifications. In such instances, when a call is received and forwarded to voicemail, the API may set the caller identification to 'anonymous' and the email notification and file name would thereafter include 'anonymous' in the place of a caller name. The API might also include an option to perform an action, such as play a welcome message under defined circumstances. Yet further, the API might include an option to request the recipient of a call to enter a particular dual-tone multi-frequency (DTMF) signal (such as the number '1') to answer an incoming call.

The API server 604 can also provide API-defined functions that interact with the second XML derivative language documents in a defined manner. For instance, an API provided by API server 604 might direct the call control engine to call a destination, and then connect to an extension account with a pre-defined XML derivative document. In such examples, the call control engine might pass call options and application data (e.g., customer data) to the XML engine. For example, an appointment reminder option may be defined in the API and performed by the call control engine, where appointment information in a calendar extension account may be routed to a particular destination with instructions to play in voice or SMS/XMS format. Details regarding the appointment may be retrieved from the extension account using the XML derivative document, such as a location, date, time, and notes regarding the appointment.

In some examples, a XML derivative document may itself invoke an API provided by the API server 604. For instance, a second XML derivative document may be used to create a message recording service, obtain an access token from an authentication server, send a HTTP request to the call control engine to route a call to a particular destination and play the recorded message. In such an example, a user may dial into an extension account with the second XML derivative document, record the message to be sent, then end the call. The second XML derivative document may identify the end of the call and execute logic which will initiate the HTTP request to invoke an API to play the recorded message to a particular destination number.

Such directives (e.g., provided by such XML derivative documents) can also be loaded from a database 622, which might be hosted by the VoIP provider as part of the PaaS solution. XML derivative documents can also be retrieved from a customer database 616. For example, the XML derivative documents could be retrieved using an HTTP connection to a web application server 614. At the same time that the document derivatives are retrieved, additional information can also be provided, such as audio files 618, 626. The audio files could be used for various purposes, such as for implementing auto attendant functions.

In various embodiments, a customer can use databases and other data sources that are offered by the VoIP provider without having direct access to the data. For instance, the customer can use the second XML derivative language to generate queries that identify a data source and a conditional response based upon the query results. As described herein, the data retrieved from the data sources can be PBX data and/or data relating to PBX states, VoIP provider system record data, customer data hosted in VoIP provider space, and/or customer data hosted in a private cloud or in premises with public APIs. The call control engine can carry out the conditional response based upon the results of the query without the customer ever receiving, or otherwise having access to, the data driving the conditional response. A particular example involves a query to a call analytics database for the VoIP provider. A customer could be given the limited, indirect access to the database through XML derivative-driven queries, while the VoIP services provider maintains control over the proprietary contents of the database. The database might also contain information about individual callers that would raise privacy concerns in which cases the VoIP services provider can use another set of rules for deciding whether and how to use/share such privacy information. As an example, one set of privacy rules may ensue from law of one or more particular governing agencies, requiring that such information be first encrypted before being transferred or stored to a readable/accessible platform. In this manner the document directives are retrieved with such additional information for decisions to be made based on another set of rules.

In some instances, the customer can allow the VoIP provider to indirectly access data sources in response to XML derivative-driven queries. For example, the customer can specify, in a second XML derivative document, a URI that points to a customer-provided server and specifies an associated query. The customer-provided server can execute, for example, a local script that may rely upon customer data. The script can generate a response in the form of a second XML derivative document. The call control engine can then carry out call routing, or other call control functions, based upon the response and without ever having direct access to the customer data.

In certain embodiments, the call control engine 610 can provide call processing information to a monitor server 612 (e.g., a remote web consolelogger application). The call control engine 610 can then execute the second XML derivative documents. In an example implementation, the second XML derivative document might invoke various other services, such as a text-to-speech application 606. For example, a second XML derivative document might specify that a string of text be converted to speech using a corresponding command (e.g., "<say>Hello, please hold. </say>"). The second XML derivative document can also request access to various other data sources, such as IP PBX data model 620 and a hosted data storage 622. As described herein, the data retrieved from the data sources can be PBX data and/or data relating to PBX states, VoIP provider system record data, customer data hosted in VoIP provider space, and/or customer data hosted in a private cloud or in premises with public APIs. Further, the second XML derivative document can specify that an SMS/MMS (XMS) text message be sent using XMSApp 624 or generate new calls (e.g., for call conferencing or call forking). The provided examples of capabilities using XML derivative documents are not limiting.

Figure 7:
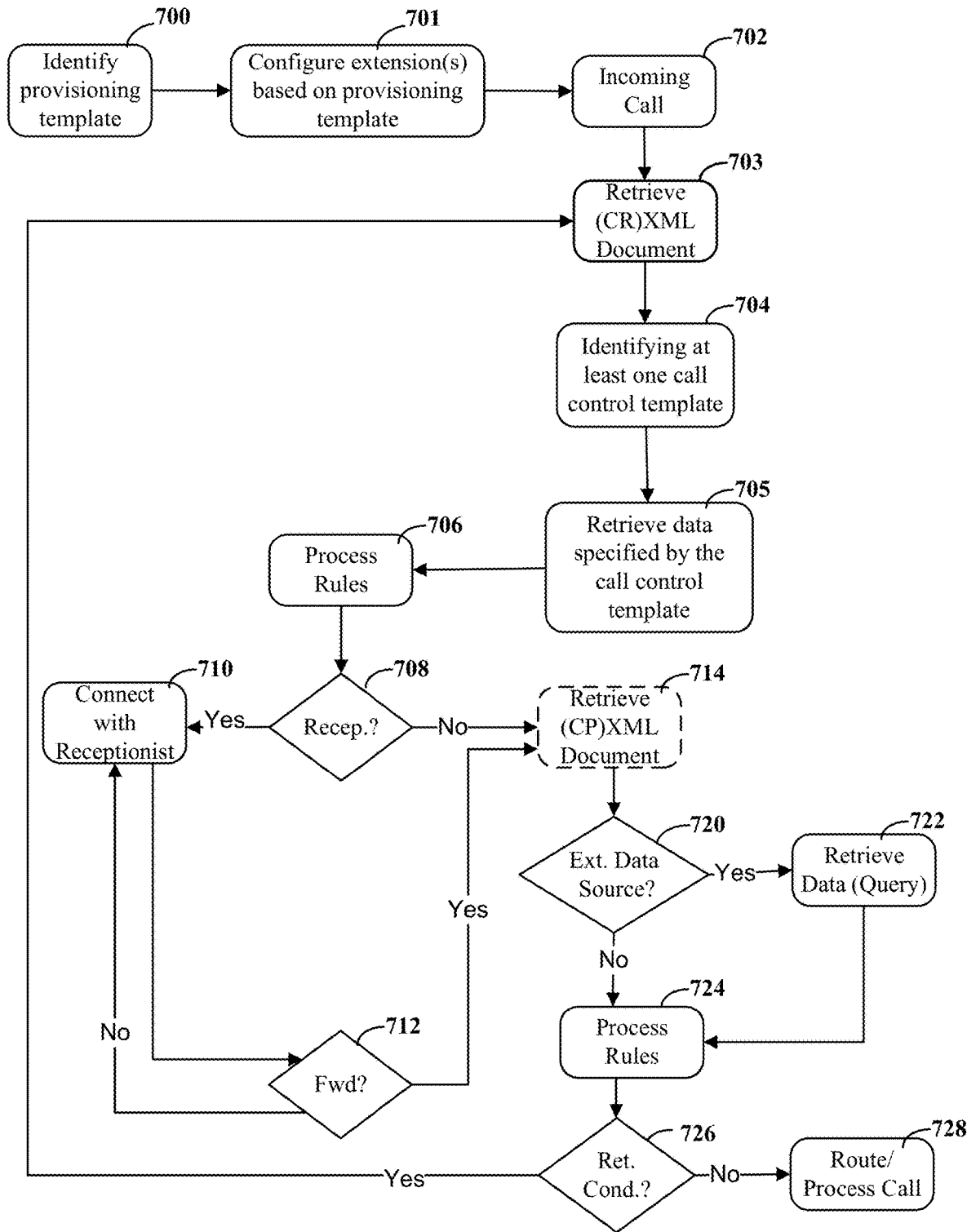
FIG. 7 is a flow diagram for template-based configuration and management of telecommunications services, consistent with embodiments of the present disclosure.

FIG. 7 is a flow diagram for template-based configuration and management of telecommunications services, consistent with embodiments of the present disclosure. The flow begins with identifying a provisioning template for at least one extension of a client entity, wherein the provisioning template includes configuration parameters for providing one or more call processing functions to the extensions, per block 700. As described herein, the provisioning template(s) used may be identified by template ID, and by traversing a hierarchy of provisioning templates. At 701, the extension(s) are configured based on the provision template selected. The flow continues at 702 with receipt of an incoming call. The incoming call information provides data about the number called and may also include information about the calling number (e.g., Caller ID). The called number may correspond to one of multiple accounts that are supported by a receptionist (or by several receptionists), for example, operating on behalf of a client entity subscribing to a set of VoIP telecommunications services.

In response to receipt of the call, a call control engine (e.g., 610 of FIG. 6 at the services provider side of the interface) can access the appropriate call routing and call processing rules per block 703. As discussed herein, a first level of call processing rules may be provided by the VoIP service provider to the subscribing client entity in the form of an XML-type document for receipt and interpretation by the call control engine.

In particular embodiments, there can also be multiple levels of call processing rules and optionally with multiple XML-type languages or different sets of instruction sets used in connection with the different respective levels. As a specific example, the call control engine can use a first (e.g., light-weight) XML derivative document that functions as a plugin module to the call control engine. Subsequent call processing rule levels can use documents written with more complex language(s) that can use a superset of commands relative to the first level (e.g., documents that use the second XML derivative). For instance, the call control engine can identify at least one call control template, at block 704, that is associated with the incoming call. The call control template can be written in a second XML derivative language, and may be common for a plurality of end-users of a client entity, or in some cases, common for a plurality of client entities. As discussed herein, each call control template can direct the call control engine to carry out call flow and call functions based upon retrieved data. For example, the call control template document can contain a number of conditional statements that specify different actions depending upon the retrieved data. The call control template can include call processing functions common to a plurality of end-users of the client entity, as described herein. Similarly, the call control template can direct the call control engine to retrieve client-specific control data derived from programming instructions written in the second programming language at block 705, which defines call processing functions for a particular end-user. For example, a client entity having a plurality of branch locations may generate a call control template defining default call processing functions for each branch location. The call control template may direct the call control engine to retrieve instructions for call processing functions for each particular branch location. The call control template may be created by each respective client entity and provided to the VoIP provider using a customization tool (e.g., interface), as described herein. Moreover, the call control for each respective client entity may be edited and/or replaced. For instance, the client entity may provide a revised call control template, including revised call processing functions selectable by the plurality of end-users, and/or new call processing functions that may be selected by the plurality of end-users.

Consistent with certain embodiments, the call control engine can rely upon external data source(s). As discussed herein, several different manners may be used so that data can be efficiently retrieved from the external data sources. For example, XML-type documents themselves can be retrieved from an external source. For example, the identified call control template might direct the call control engine to send requests to a web server and get XML-type documents for processing. The call control engine can interpret a received XML-type document to identify (XML) language building blocks that are then rendered (executed). Each building block can define logic relating to one or more functions, such as functions for voice, call control, and flow control logic. The requests can include relevant information about the incoming call, such as the called number and the caller ID. The XML-type document may define query requests that the call control engine generates in order to retrieve data from databases or other sources of data. A query could be formatted for consistency with the source of the data (e.g., JSON) to retrieve data from third party application servers or from the VoIP server provider's cloud database).

The call control engine processes the rules defined by the XML derivative documents along with any retrieved data, per block 706. One result of the processing can be a determination of whether or not to route the call to a receptionist, per block 708. Upon connection with a receptionist, per block 710, the call can remain connected until the receptionist choses to forward the call to the called party (or to another party), per block 712. As described herein, rules pertaining to the receptionist, such as language spoken and/or hours implemented, may be defined in a call control template for a plurality of branch locations, and further defined using XML derivative documents for a particular branch location.

According to some embodiments, calls that either have not been intercepted (e.g., bypassed the receptionist) or have been forwarded by the receptionist, can be processed according to another set of XML documents, per block 714. In particular implementations, the documents retrieved per block 714 can be written using a language that has an instruction set that is a superset of the instruction set for the language used by the document retrieved per block 704 (e.g., a second XML derivative language being a superset of the first XML derivative language). The increased size of the instruction set can facilitate more complex call processing and routing operations to be defined. For example, the first XML derivative language can be used primarily for determining initial routing decisions for all incoming calls. This routing decision can be made by a call control engine located at a call routing switch that can route the incoming call to any of a plurality of IP PBXs. Each IP PBX can have a corresponding call control engine and second XML derivative document(s). The second XML derivative documents might invoke more complex call processing operations, such as triggering computer telephony integration (CTI) modules used by the called party or playing audio that is appropriate for the particular call (e.g., audio that is selected based upon factors indicated by the second XML derivative document).

Consistent with certain embodiments, the call control engine(s) can rely upon external data source(s), per blocks 720 and 722. As discussed herein, there are several different manners by which data can be retrieved from the external data sources, per block 722. Also as described herein, the data retrieved from the data sources can be PBX data and/or data relating to PBX states, VoIP provider system record data, customer data hosted in VoIP provider space, and/or customer data hosted in a private cloud or in premises with public APIs, among other types of data. The call control engine(s) processes the rules defined by the XML rules along with any retrieved data, per block 724. Based upon the rules, the call can be routed and processed, per block 728.

In some embodiments, the call can still be routed back to a receptionist, or rerouted to a different IP PBX. In particular, the second XML derivative document and/or call control template could indicate that the call be processed again by the first call control engine as noted by the connection between blocks 726 and 703. The call control engine of the IP PBX can provide information that adjusts how the call is routed during this second pass through the first call control engine (e.g., thereby avoiding a loop condition). For instance, a general call interception rule for a location, defined by a call control template, may bypass the receptionist for all calls at a particular time of day. A particular call would then be sent to an IP PBX that corresponds to the account of the dialed party. The second XML derivative document for the corresponding account might include conditions that route the call back to a receptionist. For instance, the second XML derivative document could check the online status of the called party relative to an application running on their computer. In particular, the second XML derivative document might be directed to an API that provides the online status. The conditional routing could specify that if the individual is currently in a meeting the call should be routed back to the first call control engine with instructions to route the call to an alternative party or to a receptionist.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, a (VoIP) endpoint device (or endpoint) includes a communications circuit and (computer) processing circuits which are configured to establish (VoIP) communications sessions with other endpoint devices (e.g., personal computers, IP-enabled mobile phones, and tablet computers). In certain embodiments, such a processing circuit is one or more computer processing circuits programmed to execute a set (or sets) of instructions (and/or configuration data) and configured with access to databases stored in memory circuits. The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. An apparatus for communications over one or more wide-band networks, the apparatus comprising:
    a computer server configured to interface with remotely-situated client entities using a first programming language that relates to a message exchange protocol between the computer server and data sources, the computer server configured as a private branch exchange (PBX) for data communications routing on behalf of the remotely-situated client entities;

a provisioning circuit to communicate with the remotely-situated client entities via a communications-control template written in a corresponding second programming language that is enabled to provide a lesser degree of functional control and/or communications routing relative to the first programming language and that uses information from the first programming language to provide at least one data communications function, the communications-control template being a model corresponding to respective sets of client-specific directives to be provided from and on behalf of the remotely-situated client entities, wherein each of the respective sets of client-specific directives includes client-specific configuration parameters for the computer server to provide the at least one data communications function for an associated one of the remotely-situated client entities; and a data communications circuit to cause the data communications routing for the associated client entities, according to the respective sets of client-specific directives provided from and on behalf of the remotely-situated client entities.

2. The apparatus of claim 1, wherein the provisioning circuit and the data communications circuit are a part of the computer server, and the provisioning circuit is to identify the communications-control template by pointing to an extension of a communications-control template with a particular template identifier.

3. The apparatus of claim 2, wherein the provisioning circuit is configured and arranged to generate a database that identifies each communications-control template by a different respective template identifier.

4. The apparatus of claim 1, wherein one of the respective sets of client-specific directives corresponds to a first communications-control template for one of the remotely-situated client entities, the first communications-control template including configuration parameters for data communications specified for the one of the remotely-situated client entities, and another of the respective sets of client-specific directives corresponds to another communications-control template for another one of the remotely-situated client entities, the other communications-control template including configuration parameters for data communications specified for the other one of the remotely-situated client entities as well as configuration parameters for each PBX used by the other one of the remotely-situated client entities.

5. The apparatus of claim 1, wherein the at least one data communications function relates to call-forwarding rules that apply to the associated client entity and the provisioning circuit is configured and arranged to identify the configuration parameters for the at least one data communications function by traversing higher level communications-control templates.

6. The apparatus of claim 1, wherein the associated client entity is configured with configuration parameters from higher-level communications-control templates in the absence of one or more configuration parameters for a particular one of the at least one data communications function.

7. The apparatus of claim 1, wherein the communications-control template includes one of the at least one data communications function common to a plurality of end-users of the client entity, and the data communications circuit is to retrieve data relating to the at least one data communications function for particular end-users of the plurality of end-users.

8. The apparatus of claim 7, wherein the data communications circuit is configured and arranged to interface with a customization tool including the at least one data communications function selectable by the plurality of end-users of the client entity, the at least one data communications function further relating to aspects of call processing functions particular to an end-user of the client entity or a group of end-users of the client entity.

9. The apparatus of claim 1, wherein the computer server is configured to interface with a plurality of remotely-situated client entities and identify a different respective communications-control template for each respective client entity.

10. The apparatus of claim 1, wherein the provisioning circuit is to identify the communications-control template by pointing to an extension of a communications-control template with a particular template identifier, and is to generate a database that identifies each communications-control template by a different respective template identifier.

11. An apparatus for use in a system to provide communications over one or more wide-band networks via a computer server, wherein the computer server is to interface with remotely-situated client entities using a first programming language that relates to a message exchange protocol between the computer server and data sources, the computer server configured as a private branch exchange (PBX) for data communications routing on behalf of the remotely-situated client entities, the apparatus comprising:

a provisioning circuit to communicate with the remotely-situated client entities via a communications-control template written in a corresponding second programming language that is enabled to provide a lesser degree of functional control and/or communications routing relative to the first programming language and that uses information from the first programming language to provide at least one data communications function, the communications-control template being a model corresponding to respective sets of client-specific directives to be provided from and on behalf of the remotely-situated client entities, wherein each of the respective sets of client-specific directives includes client-specific configuration parameters for the computer server to provide the at least one data communications function for an associated one of the remotely-situated client entities; and circuitry to cause the data communications routing for the associated client entities via the computer server, according to the respective sets of client-specific directives provided from and on behalf of the remotely-situated client entities.

12. The apparatus of claim 11, wherein the provisioning circuit is to identify the communications-control template by pointing to an extension of a communications-control template with a particular template identifier.

13. The apparatus of claim 11, wherein one of the respective sets of client-specific directives corresponds to a first communications-control template for one of the remotely-situated client entities, the first communications-control template including configuration parameters for data communications specified for the one of the remotely-situated client entities, and another of the respective sets of client-specific directives corresponds to another communications-control template for another one of the remotely-situated client entities, the other communications-control template including configuration parameters for data communications specified for the other one of the remotely-situated client entities as well as configuration parameters for each PBX used by the other one of the remotely-situated client entities.

14. The apparatus of claim 11, wherein the at least one data communications function relates to call-forwarding rules that apply to the associated client entity and the provisioning circuit is configured and arranged to identify the configuration parameters for the at least one data communications function by traversing higher level communications-control templates.

15. The apparatus of claim 11, wherein the associated client entity is configured with configuration parameters from higher-level communications-control templates in the absence of one or more configuration parameters for a particular one of the at least one data communications function.

16. The apparatus of claim 11, wherein the communications-control template includes one of the at least one data communications function common to a plurality of end-users of the client entity, and the circuitry is to retrieve data relating to the at least one data communications function for particular end-users of the plurality of end-users.

17. A method for communications over one or more wide-band networks, the method comprising:
via a computer server configured to interface with remotely-situated client entities and with the computer server configured as a private branch exchange (PBX) for data communications routing on behalf of the remotely-situated client entities, using a first programming language to configure the computer server to provide the data communications routing on behalf of the remotely-situated client entities;
through the use of a provisioning circuit, communicating a communications-control template with the remotely-situated client entities, wherein the communications-control template is written in a corresponding second programming language that is enabled to provide a lesser degree of functional control and/or communications routing relative to the first programming language and that uses information from the first programming language to provide at least one data communications function, the communications-control template being a model corresponding to respective sets of client-specific directives to be provided from and on behalf of the remotely-situated client entities, wherein each of the respective sets of client-specific directives includes client-specific configuration parameters for the computer server to provide the at least one data communications function for an associated one of the remotely-situated client entities; and
through use of a data communications circuit, causing the data communications routing for the associated client entities, according to the respective sets of client-specific directives provided from and on behalf of the remotely-situated client entities.

18. The method of claim 17, wherein the provisioning circuit identifies the communications-control template by pointing to an extension of a communications-control template with a particular template identifier, and is to generate a database that identifies each communications-control template by a different respective template identifier.

19. The method of claim 17, wherein one of the respective sets of client-specific directives corresponds to a first communications-control template for one of the remotely-situated client entities, the first communications-control template including configuration parameters for data communications specified for the one of the remotely-situated client entities, and another of the respective sets of client-specific directives corresponds to another communications-control template for another one of the remotely-situated client entities, the other communications-control template including configuration parameters for data communications specified for the other one of the remotely-situated client entities as well as configuration parameters for each PBX used by the other one of the remotely-situated client entities.

20. The method of claim 17, wherein the at least one data communications function relates to call-forwarding rules that apply to the associated client entity and the provisioning circuit is configured and arranged to identify the configuration parameters for the at least one data communications function by traversing higher level communications-control templates.

* * * * *